Sept. 3, 1940.    D. B. BAKER ET AL    2,213,374
TRACTOR
Filed April 28, 1939    4 Sheets-Sheet 1

Inventors
D. B. Baker
C. F. Rogers
W. O. Bechman
By Paul O. Pippel
Atty.

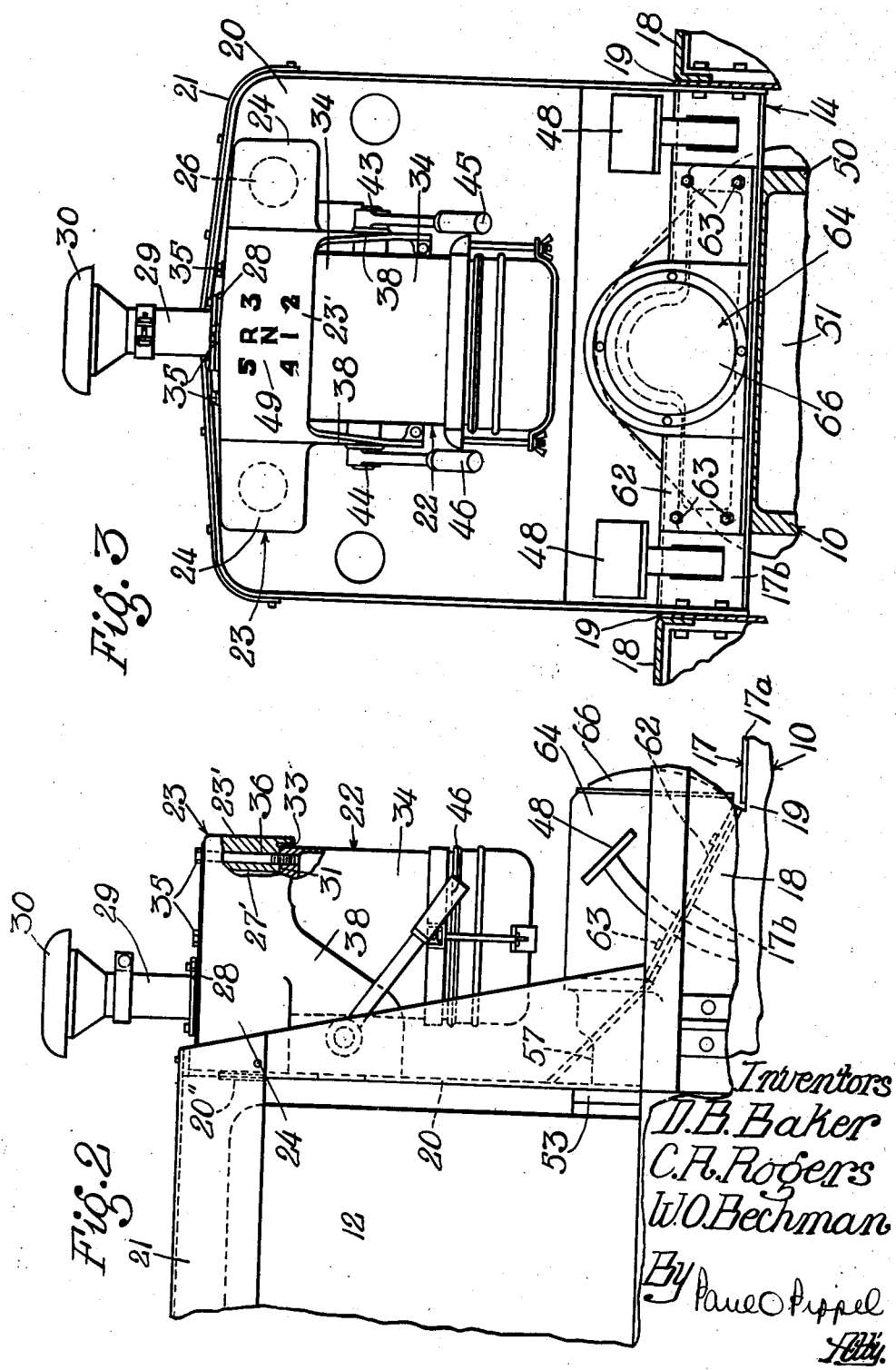

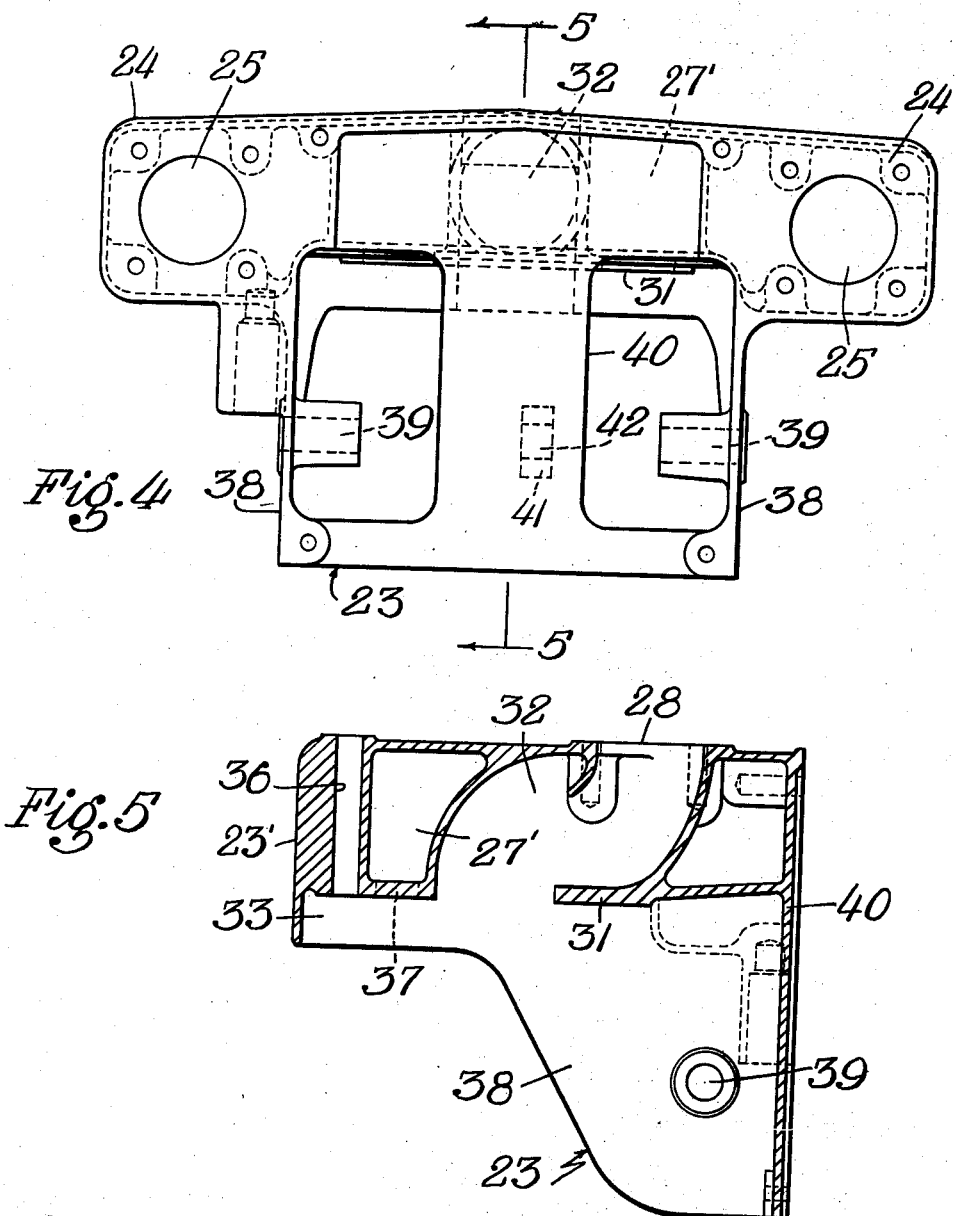

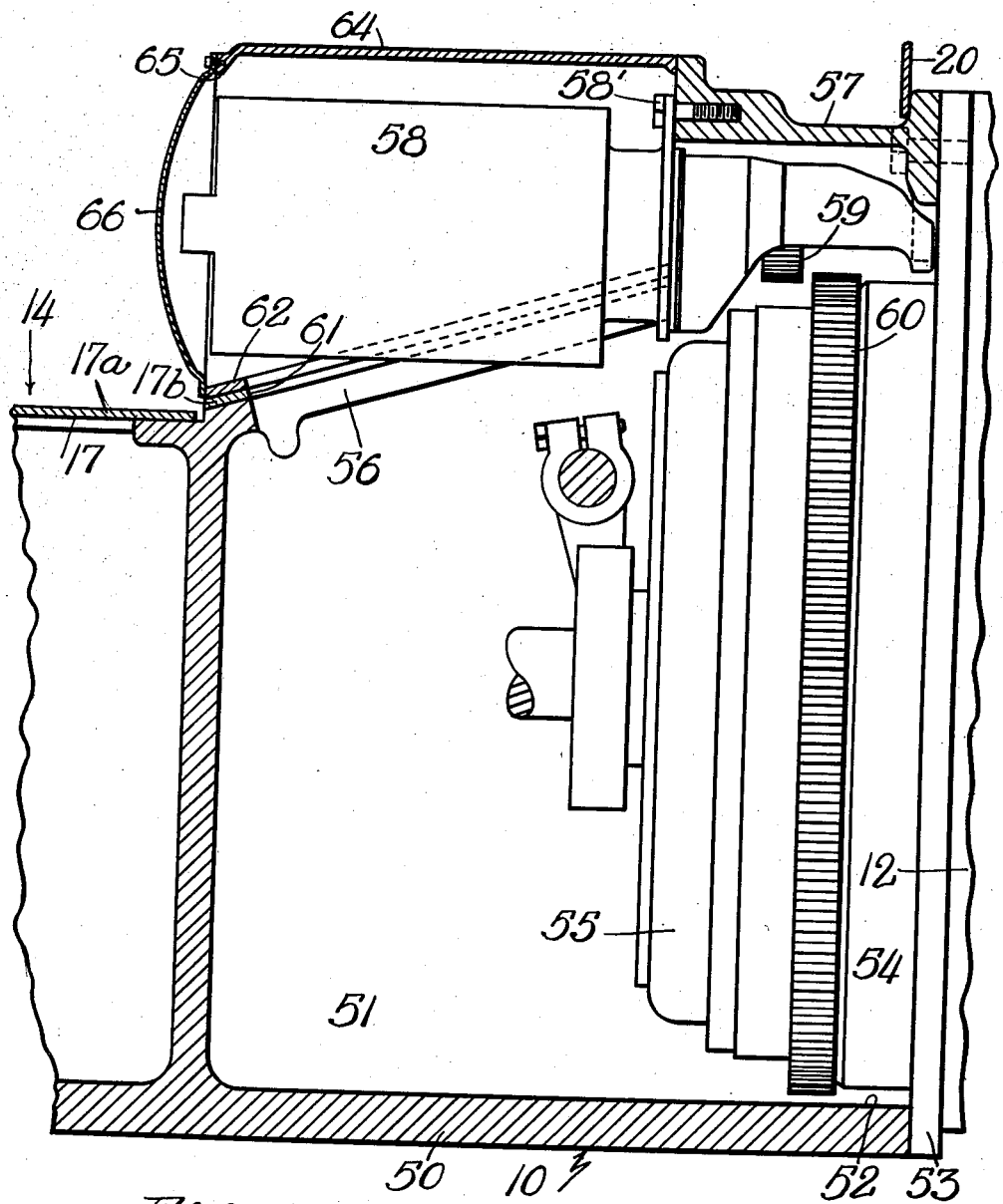

Patented Sept. 3, 1940

2,213,374

UNITED STATES PATENT OFFICE 2,213,374

TRACTOR

David B. Baker, Riverside, Clifford R. Rogers, Oak Park, and William O. Bechman, Chicago, Ill., assignors to International Harvester Company, a corporation of New Jersey Application April 28, 1939, Serial No. 270,608

6 Claims. (Cl. 180—54)

This invention relates to a tractor, and more particularly to an improved forward deck structure which provides for mounting auxiliary devices and controls on and centrally with respect to a transverse dash panel disposed on the tractor body between a forwardly disposed engine and a rearwardly disposed operator's station.

The invention particularly contemplates such improvements in a tractor of the track-laying type, and has for its principal object the improved deck structure, as aforesaid, in which an air cleaner is supported on the dash panel and centrally of the lateral width of the operator's station or deck structure. In tractors of the type preferred to, the air cleaner is normally mounted forwardly of the dash panel and in the engine compartment. Because of the use of engines of increased sizes, the problem of locating the air cleaner has became quite difficult. This is especially so, since it is desirable to have the air cleaner in close proximity to the engine. At the same time, it is also desirable to locate the air cleaner in such a position that the intake pipe thereof will not interfere with the vision of the tractor operator. The improved structure provided by the present invention includes the mounting of the air cleaner structure centrally of the operator's deck and behind the dash panel, so that the operator may easily see ahead at either side of the intake pipe.

An important object is to locate the air cleaner structure, control levers and a starting device in compact relationship in the forward central portion of the operator's deck, so that the parts do not interfere with the operation of the tractor. This is especially important in tractors provided with brake and clutch pedals located in transversely spaced relation.

Another important object is to provide for ready accessibility of the parts.

Another object, specifically, is to provide the air cleaner structure as a unitary casting comprising a housing having conduit branches adapted to be secured rigidly to the dash panel, which housing includes a rearwardly extending, horizontally disposed dome portion formed with air passages therein communicating with the branches.

Another object is to provide the dome portion in such a manner that a vertically disposed air cleaner may be easily and quickly attached thereto and detached therefrom.

Still another object is to provide an opening in the dash panel in alinement with at least one of the conduit branches through which opening the air cleaner structure may have communication with the engine air intake system.

Still another object is to provide for the location of an engine starter directly below and in vertical alinement with the air cleaner in a manner providing for compact grouping of these parts with a view toward convenience of the operator.

And still another object is to provide the forward portion of the deck structure with an opening closed by a cover including also a cover portion for the starter, which cover may be removed without disturbing the position of the air cleaner structure.

And still another object is to provide the air cleaner supporting housing with portions serving to mount engine control levers.

These and other desirable objects will be readily apparent as the disclosure and description is further set forth in detail in accordance with the illustrations of one preferred embodiment of the invention as shown in the accompanying sheet of drawings, in which:

Figure 2 is an enlarged side elevational view of the forward deck structure showing the relation between the dash panel, air cleaner, and floor structure, which includes the cover for the engine starter;

Figure 3 is a rear elevational view of the structure shown in Figure 2;

Figure 4 is an enlarged front elevational detail view of the air cleaner supporting housing;

Figure 5 is a vertical sectional view of the housing shown in Figure 4 taken on the line 5—5 of that figure; and, Figure 6 is an enlarged sectional view showing in detail the arrangement between the main body and the forward deck structure including the floor enclosing the engine starter.

Figure 1:
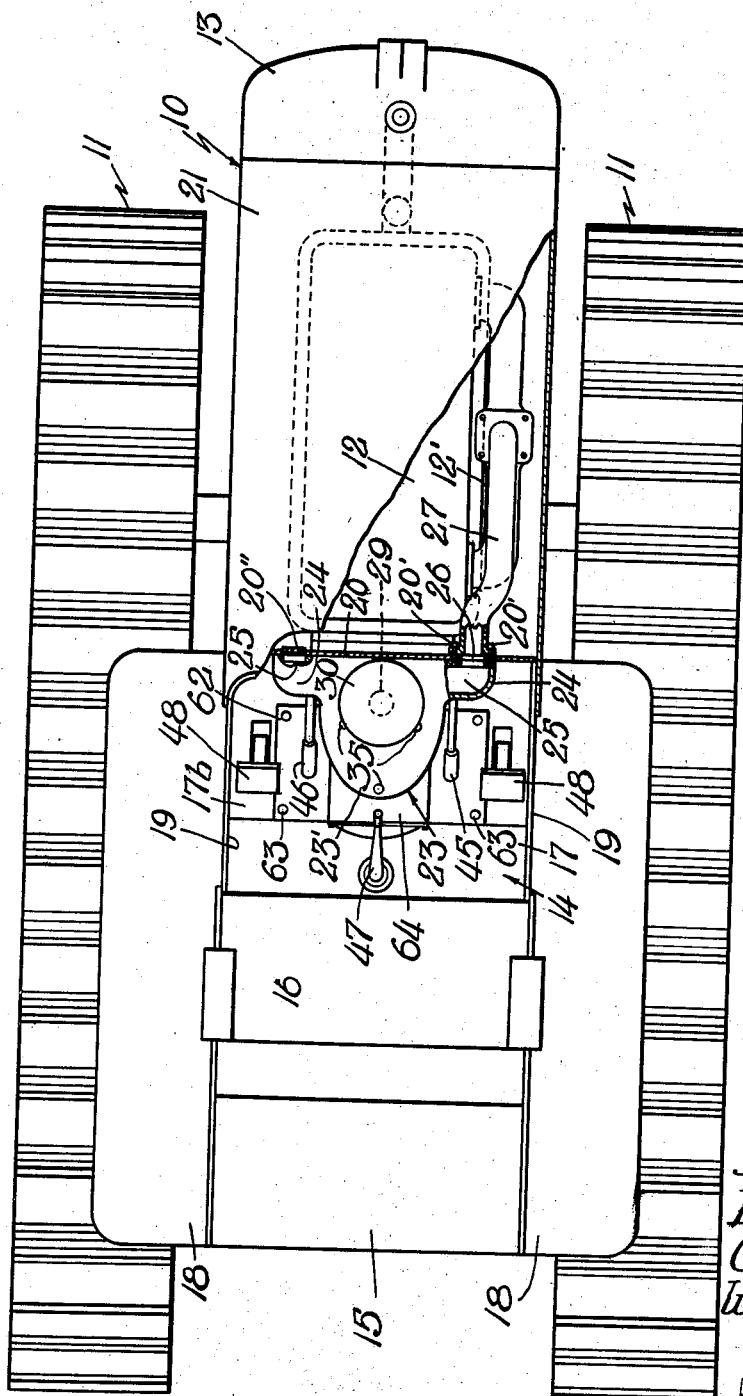
Figure 1 is a plan view of a track-type tractor showing the improved forward deck structure.

The particular tractor chosen for the purposes of illustration is a tractor of the track-laying type having a main body 10 carried on a pair of oppositely disposed self-laying tracks 11. The body includes a forwardly mounted engine 12, ahead of which is disposed the usual radiator 13, and a rearwardly disposed operator's deck structure 14. The deck structure includes a rearwardly mounted fuel tank 15 ahead of which is located an operator's station or seat 16. The structure further includes a substantially level floor or platform 17. The deck structure is provided at opposite sides respectively with transversely spaced, longitudinally running fenders 18 which respectively overlie the self-laying tracks 11. Each fender includes a longitudinally extending, vertically disposed side wall 19, the two walls serving to delineate the operator's deck structure at its sides. The forward portion of the deck is delineated by a transverse dash panel 20 which is interposed between the deck and the engine 12, the panel serving also to delineate the engine compartment at its rear. An engine hood 21 is disposed above the engine and is secured at opposite ends respectively to the radiator 12 and the dash panel 20. The improved forward deck structure includes the dash panel 20, which is rigidly secured at its lower opposite sides to the fender side walls 19.

An air cleaner unit 22 is rigidly carried by the panel 20 at its rear or operator's side. This unit comprises a cast housing 23 which has a pair of integrally formed conduit branches 24 formed with flat front faces which fit against the rear side of the dash panel. Each branch is provided with an air passage 25, one of which communicates through an opening 26 in the panel 20 with an air conduit pipe 27 connected to an air intake manifold 12' comprising part of the air intake system of the engine 12. The housing 23 is secured to the panel 20 partly by means of bolts 28', which serve also to secure the air conduit pipe 27 to the panel in an air tight manner. This is best shown in Figure 1. The other branch 24 is similarly formed with an air passage 25, and the front face of the branch is also secured to the rear face of the panel 20. In this instance, however, this branch is not connected to the air intake system of the engine. The provision of the two branches is made for the purpose of accommodating the same housing 23 to the use of different types of engines having intake manifolds at opposite sides. This provision is an important production measure when utilized in connection with tractor models powered with either gasoline or Diesel engines or with engines of different sizes or types in which the air intake manifolds are not located always at the same side. The housing 23 includes as a part thereof and integrally formed with the branches 24 a rearwardly extending dome portion 23' formed with air passages 27' therein. The dome portion 23' is considerably narrower than the lateral extent of the branch 24 and tapers rearwardly toward the operator's seat 16. The dome portion is provided with a flat upper wall or surface 28, on which is rigidly mounted an air intake pipe 29 provided with a breather 30. The underside of the dome portion is provided with a horizontal flat wall or surface 31. An air passage 32 communicates through the upper wall 28 and through the under wall or surface 31. The housing includes a substantially cylindrical, vertical, hollow portion 33, which surrounds the upper portion of an air cleaner 34, which is secured to the under surface 31 by bolts 35 passed through vertical bores 36 formed in the dome portion 23'. The incoming air is drawn through the breather 30 and conduit pipe 29 and passes through the air passage 32 and through the air cleaner, and thence through air outlet openings which are alined with outlets 37 in the dome 23' communicating with the air passages 27' and thence to the branches 24 and through the right hand branch to the intake manifold 12' of the engine. The left hand branch 24 is cut off to prevent passage of air therethrough. Provision is made for stopping the air at this point by an imperforate portion of the dash panel 20. The dash panel may be further adapted to accommodate the air cleaner unit and different types of engines having oppositely mounted intake manifolds by the provision of a partially cut opening therein; and the panel may be opened at this portion by knocking out the blank, as at 20'' in Figure 1, in any suitable manner.

The housing 23 includes integral, downwardly extending, laterally spaced side wall portions 38 extending a considerable distance downwardly past the substantially cylindrical wall 33, which surrounds the upper portion of the air cleaner 34. The walls 38 are provided with alined openings 39 formed about an axis disposed forwardly of the air cleaner 34. The front wall portions of the housing surrounding the branches 24 are extended downwardly, as at 40, to provide additional attaching surfaces for attaching the housing to the panel 20. This additional wall portion carries an integral ear 41 formed with a transverse opening 42 in alinement with the openings 39 in the side walls 38. These openings provide for journaling a pair of rock-shafts 43 and 44, which serve to carry control levers 45 and 46, respectively, which may be connected to engine controlling devices in any suitable manner. The disposition and form of the housing 23 provides for the central location of the air cleaner 34 with the control levers 45 and 46 grouped conveniently at opposite sides thereof within easy reach of the operator on the seat 16. At the same time, the central and forward location of the cleaner 34 prevents interference thereof with operation of the tractor.

The operator's deck 14 includes a plurality of control means for guiding the forward and rearward movement of the tractor and for steering the same. Among these controls are a centrally located gear shift lever 47 and a pair of transversely spaced brake pedals 48. The rearward vertical surface of the air cleaner supporting housing 23 is provided with indicia 49, indicating the gear shift changes or positions of the lever 47. It will be noted from an examination of Figure 1 that the central disposition of the air cleaner unit 22 provides free and easy access of the operator to the brake pedals 48.

The main body 10 includes a rear body part 50 formed with a clutch compartment 51. The forward part of the body part 50 is open at 52 and is secured to a flange 53 formed at the rear of the engine 12. The engine crank shaft carries at its rear end a fly-wheel 54 which is associated in a conventional manner with an engine clutch 55. The clutch compartment 51 is open at its top at 56, and the upper forward portion of the compartment is formed with a longitudinally extending, substantially semi-cylindrical portion 57 formed as an integral part of the rear body part 50. This portion 57 is disposed above that portion of the compartment 51 which houses the fly-wheel 54 and clutch 55. The dash panel 20 is cut out at its lower central portion to form a saddle portion which fits over the semi-cylindrical portion 57.

An engine starter 58 is disposed longitudinally of and above the compartment 51 and is secured by bolts 58' to the rear face of the semi-cylindrical portion 57, this portion 57 having a flat open rear face which is thus closed by attachment of the starter thereto. The starter is of the conventional type having a drive pinion 59 adapted to mesh with and drive the fly-wheel 54 through the medium of a ring gear 60 formed about the periphery of the fly-wheel. It will be noted from an examination of Figure 6 that the starter 58 extends almost entirely above the compartment 51 and is centrally located with respect thereto, being also directly in vertical alinement with the air cleaner unit 22 (see also Figure 1).

The floor or platform 17 of the operator's deck structure 14 comprises a rearward part 17a and a forward part 17b. The part 17a is substantially horizontally disposed and covers the top of the rear body part 50 rearwardly of the clutch compartment 51. The forward floor part 17b is inclined forwardly and extends laterally across the body between the fenders 18 and overlies the clutch compartment 51. This floor part is, however, formed with an opening 61 substantially coincident with the opening 56 in the clutch compartment. It is provided in the present embodiment of the invention so that the floor parts 17a and 17b remain secured in position even though it becomes necessary to obtain access to the clutch compartment 51. Provision is made for closing the openings 56 and 61 and for enclosing or housing the starter 58 by the inclusion of an additional floor or cover plate 62. This cover is secured by bolts 63 to the floor part 17b and includes an integral, or otherwise rigid, substantially cylindrical housing portion 64 which encloses the starter 58. This housing portion 64 is open at its rear at 65 and this opening is closed by a removable cover 66.

From an examination of Figures 1 and 3, it will be seen that the air cleaner unit 22 and the starting unit 58, 62 are appropriately arranged centrally of the operator's deck 14, being thus conveniently arranged with regard to the arrangement of the control devices 47 and 48 and with a view toward the convenience of the operator in operating the same. These units are shaped and located so that they do not interfere with the operator during operation of the tractor or while he is mounting or dismounting from the tractor.

From the foregoing description it will be seen that a novel and desirable arrangement of units, as described, has been provided with a general view toward improving the forward deck structure of the tractor. While the invention has been illustrated and described in conjunction with a tractor of the track-laying type, it will be understood that the same may be readily adapted to tractors of the other types.

It will be further understood, of course, that various changes may be made in the form, details, arrangement and proportions of the parts without departing from the scope of the invention, which, generally stated, consists in structure capable of carrying out the objects above set forth in the novel arrangement and combination of parts disclosed and defined in the appended claims.

What is claimed is:

1. In a tractor having a body including a forwardly disposed engine having an air intake manifold, a rear operator's deck structure, and a transverse dash panel disposed at the rear of the engine and delineating the forward portion of the deck, the combination with the dash panel of an air cleaner structure associated centrally thereof at its rear face, said structure comprising a cast housing secured to the rear face of the panel and having air passages therein, a conduit secured to the front face of the panel in communication through the panel with one of said air passages and connected to the engine manifold, and an air cleaner suspended below the housing and carried thereby, said cleaner having intake passages communicating with the passages in the housing.

2. In a tractor having a main body provided with an operator's deck structure including a transverse dash panel at its forward end having an opening therethrough, and an engine disposed forwardly of the panel and separated from the deck thereby, the combination with the panel of an air cleaner structure carried by the panel at the deck side thereof, said structure comprising a cast housing formed with a flat front face fitting the deck side of the panel and secured rigidly thereto over said opening therein, being formed further with an integral vertically disposed cylindrical portion formed with air passages therein and open at its bottom, an air intake pipe carried by said housing in communication with certain air passages, one of said passages communicating with the opening in the dash panel, an air cleaner disposed vertically and fitted into the bottom of the cylindrical hollow portion and having passages in communication with certain housing passages, and a conduit secured to the engine side of the panel over the opening therein and connected to the engine manifold.

3. In a tractor having a body including a forwardly disposed engine and a rearwardly disposed operator's deck, the combination of a dash panel structure interposed between the engine and deck, comprising a transverse dash panel delineating the forward portion of the operator's deck, a housing structure carried rigidly at the deck side of the panel and including a centrally located, vertically disposed, hollow, substantially cylindrical portion having further depending opposite side portions, an air cleaner disposed vertically and fitted within the hollow cylindrical portion, and levers carried respectively by the aforesaid side portions with the cleaner therebetween.

4. An air cleaner supporting structure for attachment of an air cleaner to a dash panel of a vehicle, said structure comprising a cast housing formed with a pair of integral branches including air passages, each branch having a flat attaching surface for attachment to the dash panel, said housing further including a central air-cleaner supporting portion integral with the branches and having air passages therein communicating with the branch passages, said supporting portion including an air inlet passage formed therein and extending therethrough and adapted to communicate with an air cleaner supported by said portion.

5. In a tractor having a main body comprising a forwardly disposed engine and a rearwardly disposed operator's station, and a transverse, vertically disposed dash panel arranged between the station and the engine, the combination with the panel of an air cleaner supporting structure comprising a cast housing having flat front wall portions secured to the rear face of the dash panel, said housing including an integral, rearwardly tapering dome portion formed with air passages, an air cleaner supported vertically by and below the dome portion and having air passages communicating with certain of the aforesaid passages, an upstanding intake pipe carried by and above the dome and communicating with certain air passages therein, and conduit means associated between certain of said passages and the engine.

6. In a tractor having a main body comprising a forwardly disposed engine and a rearwardly disposed operator's station, and a transverse, vertically disposed dash panel arranged between the station and the engine, the combination with the panel of an air cleaner supporting structure comprising a cast housing including a pair of conduit branches having flat front wall portions secured to the rear face of the dash panel, said housing including a dome portion integral with the branches and tapering rearwardly therefrom and formed with communicating air passages, an air cleaner supporting vertically by and below the dome portion and having air passages communicating with certain of the aforesaid passages, an upstanding intake pipe carried by and above the dome and communicating with certain air passages therein, and conduit means associated between one of the branches and the engine.

DAVID B. BAKER.
CLIFFORD R. ROGERS.
WILLIAM O. BECHMAN.